(12) United States Patent
Shaikh et al.

(10) Patent No.: US 9,336,250 B1
(45) Date of Patent: May 10, 2016

(54) SYSTEMS AND METHODS FOR EFFICIENTLY BACKING UP DATA

(75) Inventors: Mohammed Shaikh, Maharashtra (IN); Ravindra Teli, Maharashtra (IN); Srineet Sridharan, Maharashtra (IN); Kirk Searls, Maitland, FL (US)

(73) Assignee: Veritas Technologies, LLC, Mountain View, CA (US)

( * ) Notice: Subject to any disclaimer, the term of this patent is extended or adjusted under 35 U.S.C. 154(b) by 1058 days.

(21) Appl. No.: 13/243,421

(22) Filed: Sep. 23, 2011

(51) Int. Cl.
*G06F 17/30* (2006.01)

(52) U.S. Cl.
CPC .... *G06F 17/30306* (2013.01); *G06F 17/30212* (2013.01)

(58) Field of Classification Search
CPC .................................................. G06F 11/1448
USPC ......................................................... 707/649
See application file for complete search history.

(56) References Cited

U.S. PATENT DOCUMENTS

| 2004/0268078 A1* | 12/2004 | Hassan | 711/170 |
| 2009/0265396 A1* | 10/2009 | Ram et al. | 707/204 |
| 2010/0332818 A1* | 12/2010 | Prahlad et al. | 713/150 |

OTHER PUBLICATIONS

Narayanan, Priyesh; Method and Apparatus for Providing Point-In-Time Consistent Backup Images; U.S. Appl. No. 12/164,317, filed Jun. 30, 2008.

* cited by examiner

*Primary Examiner* — Belix M Ortiz Ditren
(74) *Attorney, Agent, or Firm* — ALG Intellectual Property, LLC (57) ABSTRACT

A computer-implemented method for efficiently backing up data may include (1) identifying a volume scheduled for a backup by a computing system, (2) determining that resource usage of the computing system will fall below a predetermined threshold for a period of time, (3) identifying at least one unit of data in the volume of data to copy to a backup image for the backup during the period of time, (4) in response to determining that the resource usage of the computing system will fall below the predetermined threshold for the period of time, copying the unit of data to the backup image during the period of time, (5) taking the snapshot of the volume, and (6) copying at least one additional unit of data from the snapshot to the backup image to make the backup image consistent with the snapshot. Various other methods, systems, and computer-readable media are also disclosed.

20 Claims, 7 Drawing Sheets

SYSTEMS AND METHODS FOR EFFICIENTLY BACKING UP DATA

BACKGROUND

In the digital age, organizations increasingly rely on digitally-stored data. To protect against data loss, an organization may use a backup system to back up important data. For example, a backup system may periodically create a full backup of a volume of data according to a defined schedule.

Unfortunately, backup systems may consume significant amounts of computing resources. For instance, backups may consume storage space, and transferring data for backups may consume I/O bandwidth and network bandwidth. Additionally, the more data there is to backup, the longer backups may take to perform. By competing for computing resources, backups may sometimes interfere with the performance of primary applications. Likewise, other applications may slow down the backup process. Furthermore, if an extended backup process is interrupted, a restoration system may have to resort to a previous backup instead of the most recent scheduled backup. Accordingly, the instant disclosure identifies and addresses a need for additional and improved systems and methods for efficiently backing up data.

SUMMARY

As will be described in greater detail below, the instant disclosure generally relates to systems and methods for efficiently backing up data by provisionally backing up data during system idle times before a snapshot is taken for a scheduled backup and then completing and correcting the provisionally backed up data after the snapshot for the scheduled backup is taken. In one example, a computer-implemented method for efficiently backing up data may include (1) identifying a volume of data scheduled for a backup by a computing system, and, before taking a snapshot of the volume of data for the backup, (2) determining that resource usage of the computing system will fall below a predetermined threshold for a period of time, (3) identifying at least one unit of data in the volume of data to copy to a backup image for the backup during the period of time, (4) in response to determining that the resource usage of the computing system will fall below the predetermined threshold for the period of time, copying the unit of data to the backup image during the period of time, (5) taking the snapshot of the volume of data, and, after taking the snapshot of the volume of data (6) copying at least one additional unit of data from the snapshot to the backup image to make the backup image consistent with the snapshot.

In one example, the unit of data may include a file stored in the volume of data. In this example, identifying the unit of data may include identifying the file within a file change journal. In some examples, the computer-implemented method may also include, before taking the snapshot, identifying a most recent backup of the volume of data. In these examples, identifying the unit of data may include identifying a change to the volume of data following the most recent backup.

In some examples, the unit of data may be selected from a priority queue. For example, identifying the unit of data may include at least partially ordering a plurality of units of data within the volume of data that require backup in a priority queue according to a likelihood of each unit of data within the plurality being overwritten in the volume of data before the snapshot is taken. In this example, identifying the unit of data may entail identifying the first unit of data on the priority queue. Partially ordering the plurality of units of data may include any of a variety of steps. For example, partially ordering the plurality of units of data may include determining that the unit of data was overwritten in the volume of data since a most recent backup and, in response to this determination, placing the unit of data in a position of lower priority within the priority queue than at least one unchanged unit of data.

In some examples, determining that the resource usage of the computing system will fall below the predetermined threshold may include determining that usage of a resource that is required both for backing up the volume of data and for a separate application running on the computing system will fall below a predetermined threshold. Additionally or alternatively, determining that the resource usage of the computing system will fall below the predetermined threshold may include monitoring the resource usage to collect usage data on the resource usage and then projecting that the resource usage will fall below the predetermined threshold for the period of time based on the usage data.

In one embodiment, the computer-implemented method may also include determining that the resource usage of the computing system will fall below the predetermined threshold for a subsequent period of time separate from the period of time. In this embodiment, the computer-implemented method may also include identifying at least one subsequent unit of data in the volume of data to copy to the backup image for the backup during the subsequent period of time. In this embodiment, the computer-implemented method may additionally include, in response to determining that the resource usage of the computing system will fall below the predetermined threshold for the subsequent period of time, copying the subsequent unit of data to the backup image during the subsequent period of time.

In some examples, the computer-implemented method may also include determining that the unit of data was overwritten in the volume of data. In these examples, the computer-implemented method may also include, in response to determining that the unit of data was overwritten, marking the unit of data as dirty to indicate that the unit of data within the backup image is no longer consistent with the volume of data.

In some embodiments, the computer-implemented method may also include determining that the unit of data was deleted from the volume of data before the snapshot was taken. In these embodiments, the computer-implemented method may also include, in response to determining that the unit of data was deleted from the volume of data, removing the unit of data from the backup image.

In one embodiment, a system for implementing the above-described method may include an identification module programmed to identify a volume of data scheduled for a backup by a computing system. The system may also include a resource module programmed to determine, before taking a snapshot of the volume of data for the backup, that resource usage of the computing system will fall below a predetermined threshold for a period of time. The system may additionally include a backup module programmed to identify at least one unit of data in the volume of data to copy to a backup image for the backup during the period of time. The backup module may also be programmed to, in response to determining that the resource usage of the computing system will fall below the predetermined threshold for the period of time, copy the unit of data to the backup image during the period of time. The system may also include a snapshot module programmed to take the snapshot of the volume of data. The system may further include a consistency module programmed to, after taking the snapshot of the volume of data, copy at least one additional unit of data from the snapshot to the backup image to make the backup image consistent with the snapshot. The system may additionally include at least one processor configured to execute the identification module, the resource module, the backup module, the snapshot module, and the consistency module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a volume of data scheduled for a backup by a computing system, and, before taking a snapshot of the volume of data for the backup, (2) determine that resource usage of the computing system will fall below a predetermined threshold for a period of time, (3) identify at least one unit of data in the volume of data to copy to a backup image for the backup during the period of time, (4) in response to determining that the resource usage of the computing system will fall below the predetermined threshold for the period of time, copy the unit of data to the backup image during the period of time, (5) take the snapshot of the volume of data, and, after taking the snapshot of the volume of data (6) copy at least one additional unit of data from the snapshot to the backup image to make the backup image consistent with the snapshot.

As will be explained in greater detail below, by provisionally backing up data during system idle times before a snapshot is taken for a scheduled backup and then completing and correcting the provisionally backed up data after the snapshot for the scheduled backup is taken, the systems and methods described herein may reduce competition for computing resources with other applications. Furthermore, in some cases scheduled backups may be completed more quickly, potentially making scheduled backups available sooner and thereby increasing protection of system data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
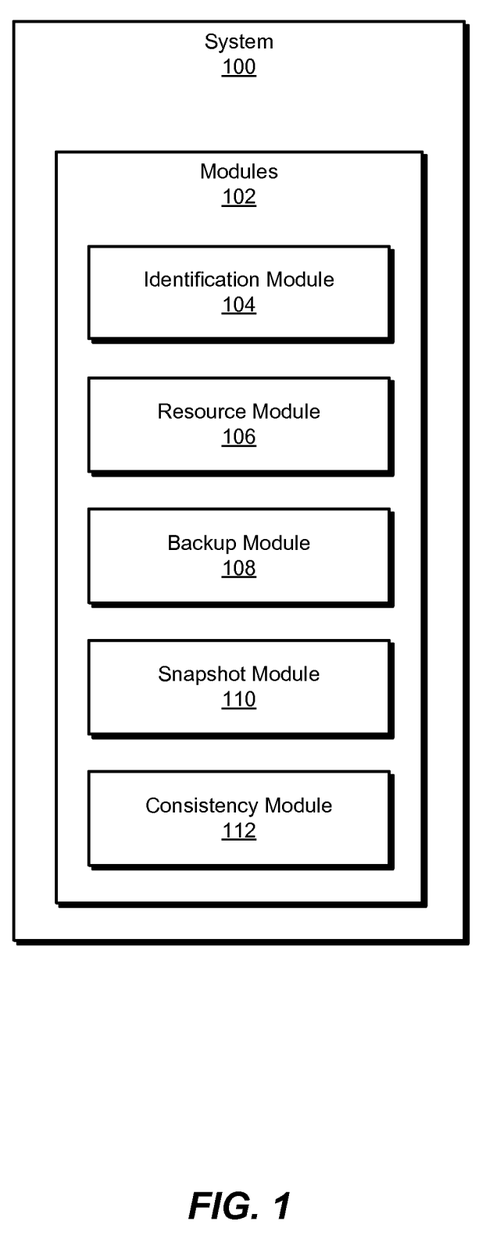
FIG. 1 is a block diagram of an exemplary system for efficiently backing up data.
Figure 2:
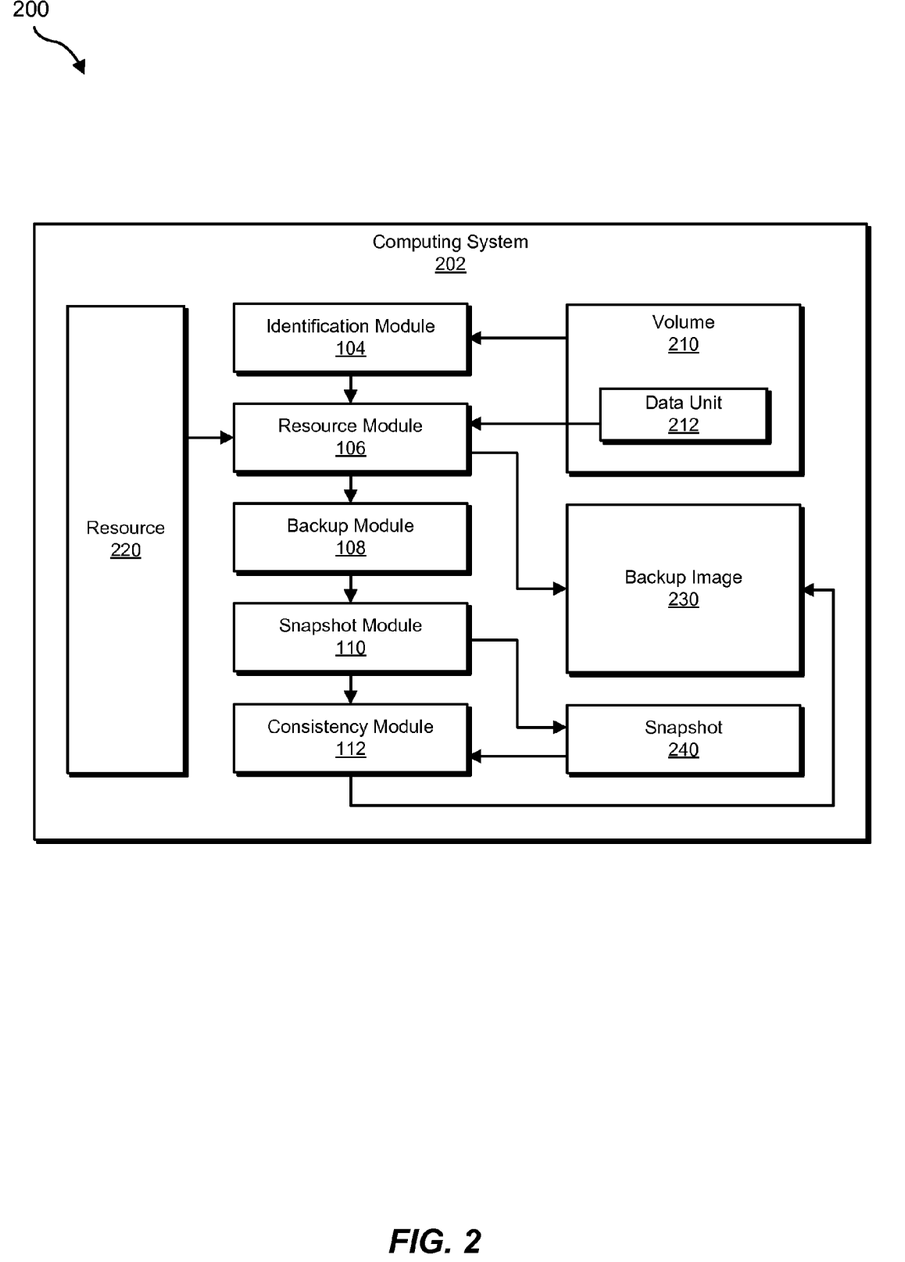
FIG. 2 is a block diagram of an exemplary system for efficiently backing up data.
Figure 3:
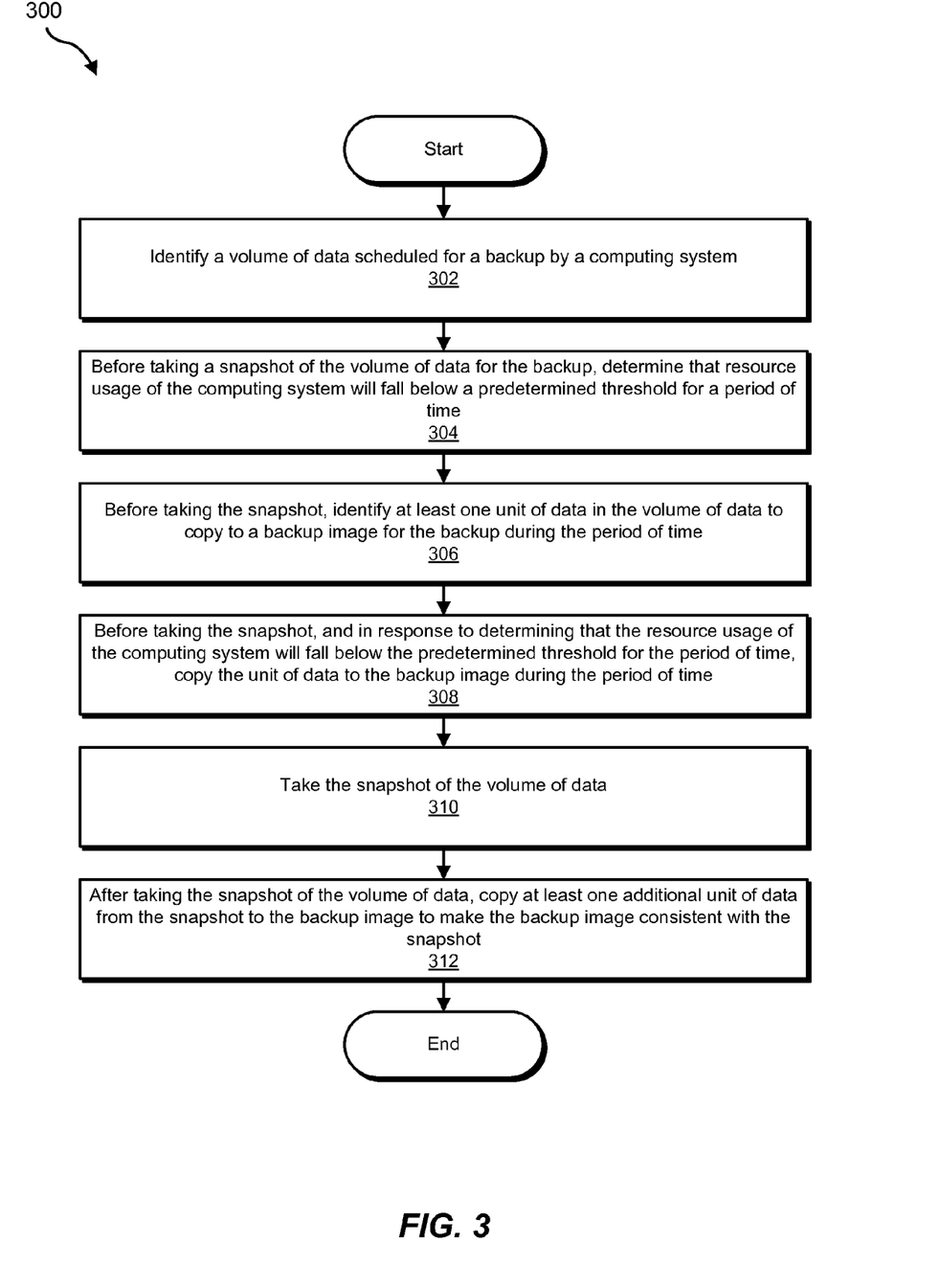
FIG. 3 is a flow diagram of an exemplary method for efficiently backing up data.
Figure 4:
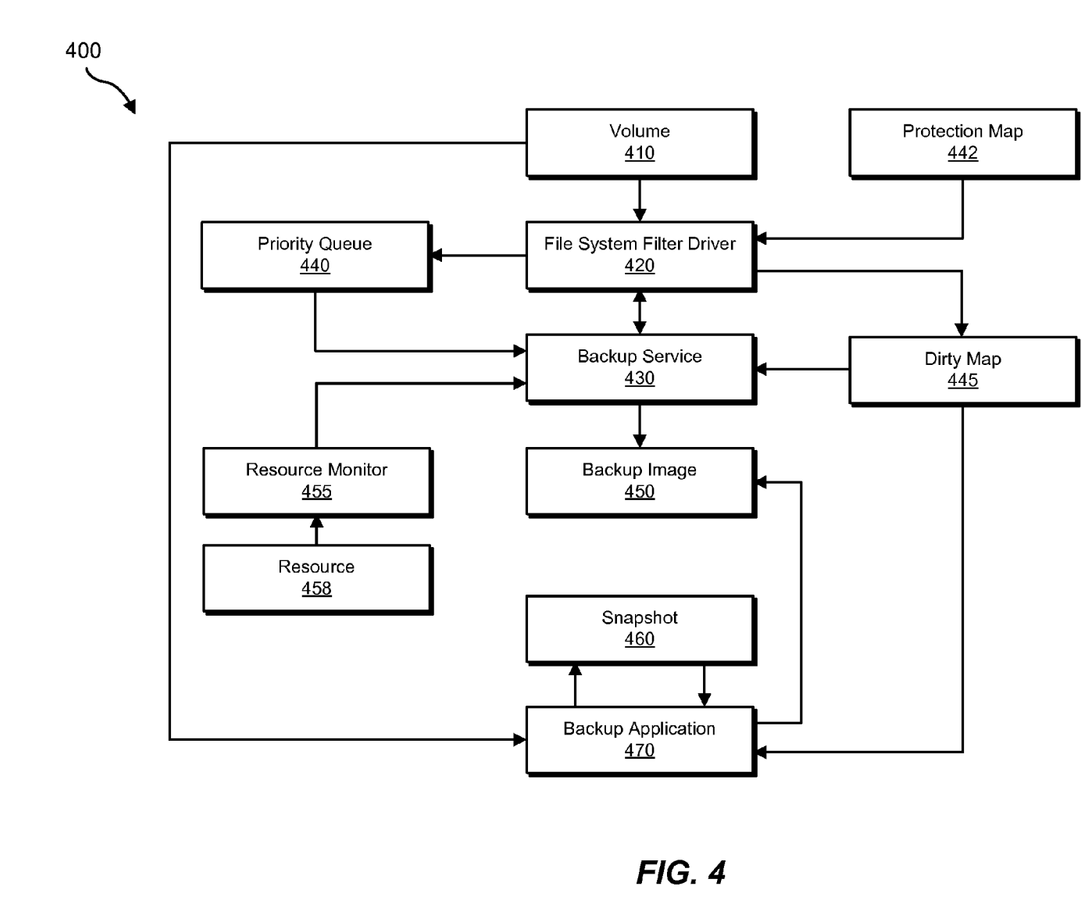
FIG. 4 is a block diagram of an exemplary system for efficiently backing up data.

The following will provide, with reference to FIGS. 1, 2, and 4, detailed descriptions of exemplary systems for efficiently backing up data. Detailed descriptions of corresponding computer-implemented methods will also be provided in connection with FIG. 3. Detailed descriptions of an exemplary timeline for efficiently backing up data will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for efficiently backing up data. As illustrated in this figure, exemplary system 100 may include one or more modules 102 for performing one or more tasks. For example, and as will be explained in greater detail below, exemplary system 100 may include an identification module 104 programmed to identify a volume of data scheduled for a backup by a computing system. Exemplary system 100 may also include a resource module 106 programmed to, before a snapshot of the volume of data for the backup is taken, determine that resource usage of the computing system will fall below a predetermined threshold for a period of time. Exemplary system 100 may additionally include a backup module 108 programmed to, before the snapshot is taken, identify at least one unit of data in the volume of data to copy to a backup image for the backup during the period of time. Backup module 108 may also be programmed to, in response to determining that the resource usage of the computing system will fall below the predetermined threshold for the period of time, copy the unit of data to the backup image during the period of time.

In addition, and as will be described in greater detail below, exemplary system 100 may include a snapshot module 110 programmed to take the snapshot of the volume of data. Exemplary system 100 may also include a consistency module 112 programmed to, after taking the snapshot of the volume of data, copy at least one additional unit of data from the snapshot to the backup image to make the backup image consistent with the snapshot. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such computing system 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing system 202 scheduled for a backup of a volume 210.

In one embodiment, identification module 104, resource module 106, backup module 108, snapshot module 110, and/or consistency module 112 from FIG. 1 may, when executed by at least one processor of computing system 202, facilitate computing system 202 in efficiently backing up data. For example, and as will be described in greater detail below, identification module 104 may be programmed to identify volume 210 scheduled for a backup by computing system 202. Resource module 106 may be programmed to, before taking a snapshot 240 of volume 210 for the backup, determine that resource usage of computing system 202 (e.g., of a resource 220) will fall below a predetermined threshold for a period of time. Backup module 108 may be programmed to identify at least one unit of data (e.g., a data unit 212) in volume 210 to copy to a backup image 230 for the backup during the period of time. Backup module 108 may also be programmed to, in response to determining that the resource usage of computing system 202 will fall below the predetermined threshold for the period of time, copy data unit 212 to backup image 230 during the period of time. Snapshot module 110 may be programmed to take snapshot 240 of volume 210. Consistency module 112 may be programmed to, after taking snapshot 240 of volume 210, copy at least one additional unit of data from snapshot 240 to backup image 230 to make backup image 230 consistent with snapshot 240.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

FIG. 3 is a flow diagram of an exemplary computer-implemented method 300 for efficiently backing up data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a volume of data scheduled for a backup by a computing system. For example, at step 302 identification module 104 may, as part of computing system 202 in FIG. 2, identify volume 210 scheduled for a backup by computing system 202.

As used herein, the phrase "volume of data" may refer to any collection of data. Examples of a volume of data include, but are not limited to, a database, a file system partition, a logical volume, and/or a selected group of files. Additionally, as used herein the term "backup" may refer to any procedure to backup, duplicate, and/or protect data and/or the results of any such procedure.

Identification module 104 may identify the volume of data in any suitable context. For example, identification module 104 may identify the volume of data by reading a configuration of a backup system to perform the backup of the volume of data. Additionally or alternatively, identification module 104 may receive a message from the backup system identifying the volume of data. In some examples, identification module 104 may operate as a part of the backup system and identify the volume of data as the volume of data scheduled for backup.

FIG. 4 illustrates an exemplary system 400 for backing up data. As shown in FIG. 4, system 400 may include a volume 410. Using FIG. 4 as an example, at step 302 identification module 104 may identify volume 410 as a volume scheduled for a backup.

Returning to FIG. 3, at step 304 one or more of the systems described herein may, before taking a snapshot of the volume of data for the backup, determine that resource usage of the computing system will fall below a predetermined threshold for a period of time. For example, at step 304 resource module 106 may, before taking a snapshot 240 of volume 210 for the backup, determine that resource usage of the computing system (e.g., of a resource 220) will fall below a predetermined threshold for a period of time. Using FIG. 4 as another example, at step 304 resource module 106 may, before taking a snapshot 460 of volume 410 for backup, determine that usage of a resource 458 will fall below a predetermined threshold for a period of time.

Resource module 106 may determine the usage of any of a variety of resources. For example, resource module 106 may determine the usage of processor resources, I/O resources, disk resources, network resources, volatile memory resources, or any combination thereof. In some examples, resource module 106 may determine the usage of one or more resources used by one or more other applications configured to execute on computing system 202. For example, resource module 106 may determine usage of a resource that is required both for backing up the volume of data and for a separate application running on the computing system will fall below a predetermined threshold. In some examples, resource module 106 may estimate the resource requirements of the separate application and/or account for an estimate of the requirements of the separate application to set the predetermined threshold.

Resource module 106 may determine the resource usage in any of a variety of ways. For example, resource module 106 may monitor the resource usage to collect usage data on the resource usage. Resource module 106 may then project that the resource usage will fall below the predetermined threshold for the period of time based on the usage data. Additionally or alternatively, resource module 106 may simply detect that resource usage has fallen below the predetermined threshold and immediately begin tolling the period of time. Using FIG. 4 as an example, resource module 106 may use a resource monitor 455 to gather usage information on resource 458.

In another example, resource module 106 may determine the resource usage by reading a configuration file specifying a schedule for applications to execute. Additionally or alternatively, resource module 106 may gather historical information about the time of day and/or days of the week when resource usage is usually high and/or certain applications execute.

In some examples, resource module 106 may account for application priority in determining the predetermined threshold. For example, resource module 106 may use a higher predetermined threshold when competing for resources with low-priority and/or secondary applications, and resource module 106 may use a lower predetermined threshold when competing for resource with high-priority and/or primary applications.

Figure 5:
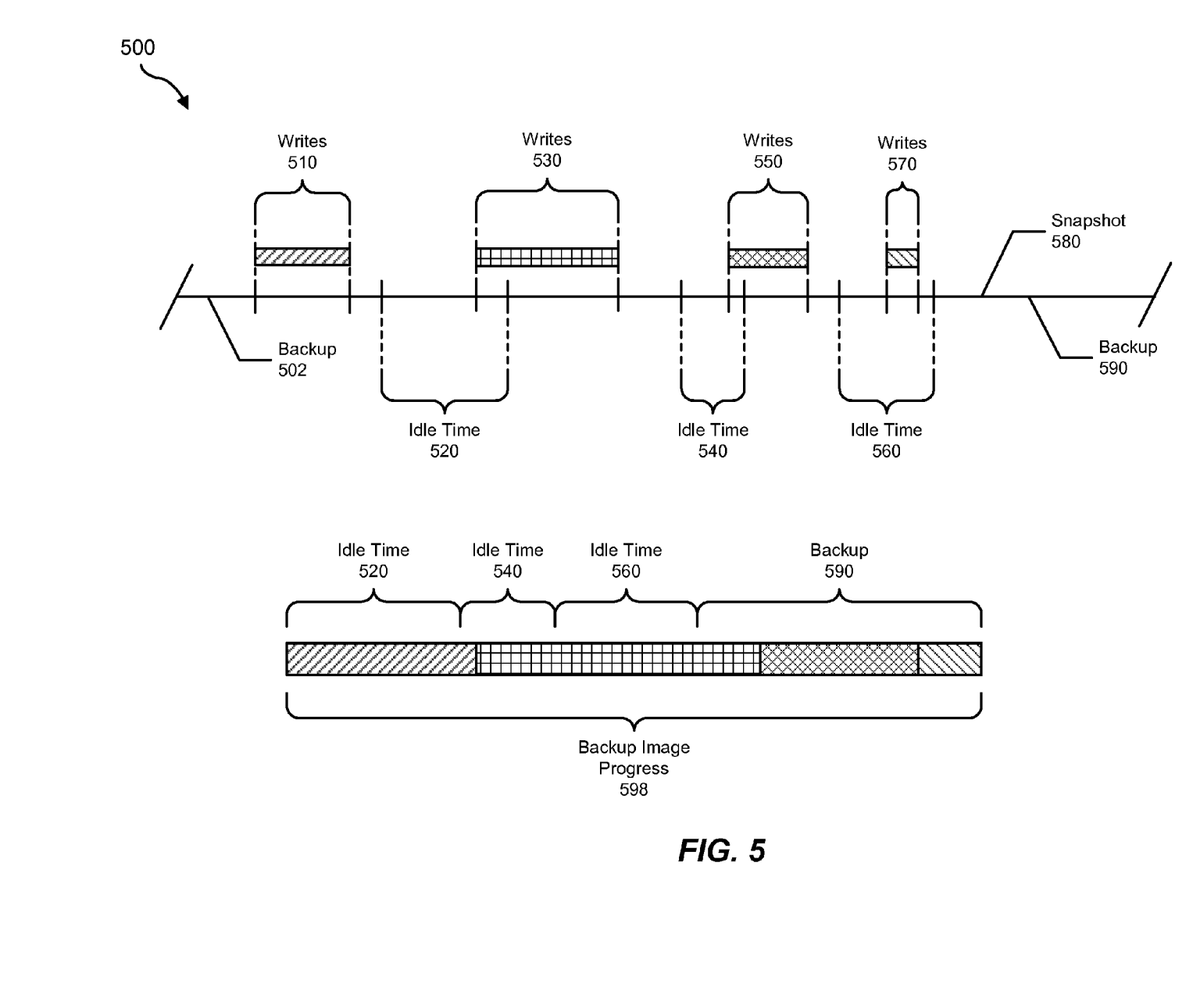
FIG. 5 is an exemplary timeline for efficiently backing up data.

FIG. 5 illustrates an exemplary timeline 500. As shown in FIG. 5, a computing system may have multiple periods of idle time between a backup 502 and a snapshot 580 for a backup 590. For example, an idle time 520, an idle time 540, and an idle time 560 may indicate times when computing resources are underutilized. Accordingly, at step 304 resource module 106 may determine that resource usage of computing system 202 will fall below the predetermined threshold during idle time 520.

In some examples, the systems and methods described herein may utilize multiple periods of idle time before the snapshot to start backing up data. For example, resource module 106 may also be programmed to determine that the resource usage of computing system 202 will fall below the predetermined threshold for a subsequent period of time separate from the period of time. Using FIG. 5 as an example, resource module 106 may also determine that resource usage of computing system 202 will fall below the predetermined threshold during idle time 540.

Returning to FIG. 3, at step 306 one or more of the systems described herein may identify at least one unit of data in the volume of data to copy to a backup image for the backup during the period of time. For example, at step 306 backup module 108 may identify data unit 212 in volume 210 to copy to backup image 230 for the backup during the period of time. Using FIG. 4 as another example, at step 306 backup module 108 (e.g., as file system filter driver 420) may identify a unit of data in volume 410 to copy to a backup image 450.

As used herein, the phrase "unit of data" may refer to any discrete measurement and/or division of data. Examples of units of data may include, without limitation, blocks, files, regions within files, objects, database records, and the like.

Backup module 108 may use any of a variety of methods to identify the unit of data. As mentioned above, in some examples the unit of data may include a file. In these examples, backup module 108 may identify the unit of data within a file change journal. For example, backup module 108 may monitor the file change journal and determine that the file change journal indicates that unit of data has changed (e.g., since a previous backup). Additionally or alternatively, backup module 108 may identify the unit of data by detecting a change in a size of a file, a change in a timestamp of a file, and/or detecting the closure of a file for writing.

In another example, the unit of data may include a block. In this example, backup module 108 may operate as part of a file system driver and identify the unit of data as a block being changed. Using FIG. 4 as an example, system 400 may include a file system filter driver 420. Backup module 108 may operate as a part of file system filter driver 420 to observe any write operations performed on volume 410 and determine that the unit of data on volume 410 has changed. As will be explained in greater detail below, backup module 108 (e.g., file system filter driver 420) may then update a priority queue 440 with the unit of data and/or forward the unit of data to backup service 430.

In some examples, backup module 108 may also, before taking the snapshot, identify a most recent backup of the volume of data. In these examples, identifying the unit of data may include identifying a change to the volume of data following the most recent backup. Using FIG. 5 as an example, backup module 108 may identify backup 502 as the most recent backup. Backup module 108 may then identify writes 510 as a change to the volume of data. Accordingly, backup module 108 may identify the unit of data within writes 510.

In another example, the unit of data may include a region within a file. In this example, backup module 108 may operate as part of a file system driver and identify the unit of data as a region within a file being changed. Additionally or alternatively, backup module 108 may compare the file with a previous backup of the volume of data to identify the changed region. For example, backup module 108 may compare a hash of a chunk of data in the previous backup with a hash of a chunk of data in the file to identify the changed region. Generally, backup module 108 may use any suitable differencing scheme to identify the unit of data.

As mentioned earlier, in some examples backup module 108 may also prioritize data to be backed up. Accordingly, backup module 108 may place the unit of data within a priority queue. Backup module 108 may then later identify the unit of data as ready for backup. For example, backup module 108 may partially order a plurality of units of data within the volume of data that require backup in a priority queue according to a likelihood of each unit of data within the plurality being overwritten in the volume of data before the snapshot is taken. After identifying the unit of data a first time, backup module 108 may place the unit of data in the priority queue. When the unit of data later reaches the front of the priority queue, backup module 108 may then identify the unit of data as the first unit of data on the priority queue. Accordingly, the unit of data may be the next data to back up.

Backup module 108 may order the priority queue in any of a variety of ways. For example, backup module 108 may give low priority to blocks that tend to receive frequent writes. For example, backup module 108 may give low priority to file system metadata blocks, such as Master File Table blocks, page file blocks, and the like. Backup module 108 may also give low priority to some blocks that represent application metadata that receive frequent writes. In some examples, backup module 108 may give low priority to blocks that recently received writes. Conversely, backup module 108 may give high priority to blocks and/or files unlikely to receive frequent writes and/or likely to receive either no writes or one write between backups. For example, backup module 108 may give high priority to executable files, libraries, and/or system files.

In one example, backup module 108 may maintain a dirty map indicating which blocks have been overwritten since the most recent backup. Likewise, backup module 108 may maintain a dirty table indicating which files have been written to since the most recent backup. In some examples, backup module 108 may determine that the unit of data was overwritten in the volume of data (e.g., since the most recent backup). In these examples, backup module 108 may, in response to determining that the unit of data was overwritten, mark the unit of data as dirty to indicate that the unit of data within the backup image is no longer consistent with the volume of data. As will be explained in greater detail below, the systems and methods described herein may reconcile the inconsistency after the snapshot is taken. In these examples, backup module 108 may also place the unit of data in a position of lower priority within the priority queue than at least on unchanged unit of data (e.g., based on the unit of data having been overwritten and the unchanged unit of data not having been overwritten).

Using FIG. 4 as an example, file system filter driver 420 may operate to identify and prioritize data to backup from volume 410. Accordingly, file system filter driver 420 may generate and maintain priority queue 440 based on writes to volume 410 and the properties of the writes. In some examples, file system filter driver 420 may check blocks of data against a protection map 442 to determine where to place each block of data on priority queue 440. For example, protection map 442 may indicate one or more blocks and/or files that are likely to receive frequent writes. When file system filter driver 420 observes such blocks are written to volume 410, file system filter driver 420 may place these blocks at the end of priority queue 440. In addition to placing overwritten blocks on volume 410 onto priority queue 440, file system filter driver 420 may mark overwritten blocks as dirty on a dirty map 445. If a same block is subsequently overwritten on volume 410, file system filter driver 420 may place the block at the end of priority queue 440. Additionally or alternatively, backup service 430 may retrieve a block from priority queue 440, determine that the block is marked as dirty on dirty map 445, and skip backing up the dirty block.

Backup module 108 may determine which blocks are likely to receive multiple writes between backups in a variety of ways. In some examples, backup module 108 may monitor write patterns to the volume of data. Additionally or alternatively, backup module 108 may read from a configuration file identifying blocks that are likely to receive multiple writes between backups. In some examples, an end user may create the configuration file. For example, the end user may specify that files in a certain folder (e.g., a build destination for a large application) will experience no more than one change between backups.

By using such techniques as a priority queue to determine the priority of data units to be provisionally backed up before the snapshot, a protection map to identify which data units are more or less likely to receive multiple writes in between backups, and/or a dirty map to identify which data units have already received writes since the most recent backup, backup module 108 may improve the efficiency and/or efficacy of the provisional backup. For example, by prioritizing backing up blocks and/or files that are unlikely to change again before the snapshot, backup module 108 may avoid spending time and/or computing resources on backing up blocks that are likely to require correction after the snapshot is taken.

As mentioned earlier, in some examples, the systems and methods described herein may utilize multiple periods of idle time before the snapshot to start backing up data. For example, resource module 106 may be programmed to determine that the resource usage of computing system 202 will fall below the predetermined threshold for a subsequent period of time separate from the period of time. In this example, backup module 108 may be programmed to identify at least one subsequent unit of data in the volume of data to copy to the backup image for the backup during the subsequent period of time. Using FIG. 5 as an example, backup module 108 may identify a unit of data in the volume of data to copy to the backup image during idle time 540. Accordingly, backup module 108 may identify data to backup during multiple periods of idle time after the most recent backup and before the snapshot for the next scheduled backup.

Returning to FIG. 3, at step 308 one or more of the systems described herein may, in response to determining that the resource usage of the computing system will fall below the predetermined threshold for the period of time, copy the unit of data to the backup image during the period of time. For example, at step 308 backup module 108 may, in response to determining that the resource usage of computing system 202 will fall below the predetermined threshold for the period of time, copy data unit 212 to backup image 230 during the period of time. Using FIG. 4 as another example, at step 308 backup module 108 (e.g., as backup service 430) may copy the unit of data to backup image 450 during the period of time.

Backup module 108 may copy the unit of data to the backup image in any suitable context. For example, backup module 108 may operate as a part of a user-level service. Using FIG. 4 as an example, backup module 108, operating as backup service 430, may copy the unit of data from priority queue 440 (or from volume 410 as identified by priority queue 440) to backup image 450. In some examples, backup module 108 may first verify that the unit of data is not marked on dirty map 445. Additionally or alternatively, backup service 430 may mark the unit of data on dirty map 445 after copying the unit of data to backup image 450. In some examples, backup service 430 may update priority queue 440 by removing the unit of data from priority queue 440. Additionally or alternatively, backup service 430 may notify file system filter driver 420 that the unit of data has been backed up.

Backup module 108 may copy the unit of data to the backup image in any suitable manner. For example, backup module 108 may copy the unit of data to the backup image according to the format of the backup image, such that the unit of data will not require rewriting and/or movement after the snapshot is taken to correctly format the backup image. In some examples, the backup image may use a virtual hard disk image format.

Using FIG. 5. as an example, backup module 108 may copy a unit of data from one of writes 510 to the backup image during idle time 520. As shown in backup image progress 598, backup module 108 may copy most of writes 510 to the backup image during idle time 520.

As mentioned earlier, in some examples, the systems and methods described herein may utilize multiple periods of idle time before the snapshot to start backing up data. For example, backup module 108 may be programmed to identify at least one subsequent unit of data in the volume of data to copy to the backup image for the backup during a subsequent period of time. Using FIG. 5 as an example, as shown by backup image progress 598, backup module 108 may finish copying writes 510 to the backup image during idle time 540, and may begin copying writes 510 to the backup image during idle time 540. Accordingly, backup module 108 may copy data to the backup images during multiple periods of idle time after the most recent backup and before the snapshot for the next scheduled backup.

Returning to FIG. 3, at step 310 one or more of the systems described herein may take the snapshot of the volume of data. For example, at step 310 snapshot module 110 may take snapshot 240 of volume 210. Using FIG. 4 as another example, at step 310 snapshot module 110 (e.g., as a part of a backup application 470) may take snapshot 460 of volume 410 (e.g., in preparation to create and/or complete backup image 450).

As used herein, the term "snapshot" may refer to any representation of a volume of data and/or a portion of a volume of data at a certain point in time. For example, snapshot module 110 may create a space-optimized read/write snapshot (e.g., a snapshot that references a volume of data in its original state at the time the snapshot is taken and records subsequent changes made to the volume of data without disturbing the view of the original state). As mentioned earlier, snapshot module 110 may take the snapshot for the scheduled backup of the volume of data. Accordingly, the snapshot may represent the point-in-time view of the volume to be backed up.

Using FIG. 5 as an example, snapshot module 110 may take snapshot 580 in preparation for backup 590. Backup 590 may include a backup of the volume of data based on the state of the volume of data at the time of snapshot 580.

Returning to FIG. 3, at step 312 one or more of the systems described herein may, after taking the snapshot of the volume of data, copy at least one additional unit of data from the snapshot to the backup image to make the backup image consistent with the snapshot. For example, at step 312 consistency module 112 may copy at least one additional unit of data from snapshot 240 to backup image 230 to make backup image 230 consistent with snapshot 240. Using FIG. 4 as another example, at step 312 consistency module 112 (e.g., as a part of backup application 470) may copy at least one additional unit of data from snapshot 460 to backup image 450 to make backup image 450 consistent with snapshot 460.

Consistency module 112 may make the backup image consistent with the snapshot in any of a variety of ways. For example, as mentioned earlier, one or more of the systems described herein may maintain a dirty map identifying data that has been overwritten (e.g., since the most recent backup). In these examples, consistency module 112 may consult the dirty map to identify data that has already been copied to the backup image but has since been overwritten. Consistency module 112 may thereby identify the additional unit of data to copy from the snapshot to the backup image to make the backup image consistent with the snapshot. Additionally or alternatively, consistency module 112 may compare the backup image with the snapshot to identify data stored in the backup image that has changed as of the time of the snapshot.

In some examples, consistency module 112 may make the backup image consistent with the snapshot simply by copying data that has changed as of the time of the snapshot but has not yet been copied to the backup image. For example, consistency module 112 may identify data remaining in a queue (e.g., the priority queue mentioned earlier). Additionally or alternatively, consistency module 112 may compare the snapshot with the backup image to determine data represented in the snapshot that has not yet been copied to the backup image.

Consistency module 112 also may make the backup image consistent with the snapshot by deleting from the backup image data that was previously copied to the backup image before the snapshot but was subsequently deleted from the volume of data before the snapshot. For example, consistency module 112 may determine that the unit of data was deleted from the volume of data before the snapshot was taken (but after, e.g., backup module 108 copied the unit of data to the backup image). Consistency module 112 may then, in response to determining that the unit of data was deleted from the volume of data, remove the unit of data from the backup image.

Using FIG. 5 as an example, after backup 502 the systems described herein may, during idle time 520, copy most of writes 510 to the backup image. During idle time 540, these systems may copy the remainder of writes 510 to the backup image as well as some of writes 530. During idle time 560, these systems may copy more of writes 530 to the backup image. After snapshot 580, consistency module 112 may copy the remainder of writes 530, as well as all of writes 550 and writes 570, to the backup image to make backup 590 consistent with snapshot 580. Accordingly, the systems and methods described herein may save the time and computing resources that would have been consumed by backing up writes 510 and most of writes 530 by backing up that data during idle times 520, 540, and 560. After step 312, method 300 may terminate.

As mentioned earlier, in some examples the unit of data may include a file. As also mentioned earlier, in some examples the systems described herein may identify the unit of data (e.g., the file) when the file is closed. In some examples, the systems and methods described herein may not only provisionally back up the file as it is after the change, but also back up a copy of the file as it was before it was changed.

In some examples, the systems and methods described herein may operate to backup data on a volume of data configured with a cache manager. The cache manager may use a lazy write policy, thereby potentially improving the performance of the systems and methods described herein. Additionally or alternatively, the cache manager may not flush temporary files to disk, thereby potentially improving the performance of the systems and methods described herein. In some examples, one or more of the steps described herein may be performed only in the presence of a cache manager configured with one or more of these benefits.

As explained above, by provisionally backing up data during system idle times before a snapshot is taken for a scheduled backup and then completing and correcting the provisionally backed up data after the snapshot for the scheduled backup is taken, the systems and methods described herein may reduce competition for computing resources with other applications. Furthermore, in some cases scheduled backups may be completed more quickly, potentially making scheduled backups available sooner and thereby increasing protection of system data.

Figure 6:
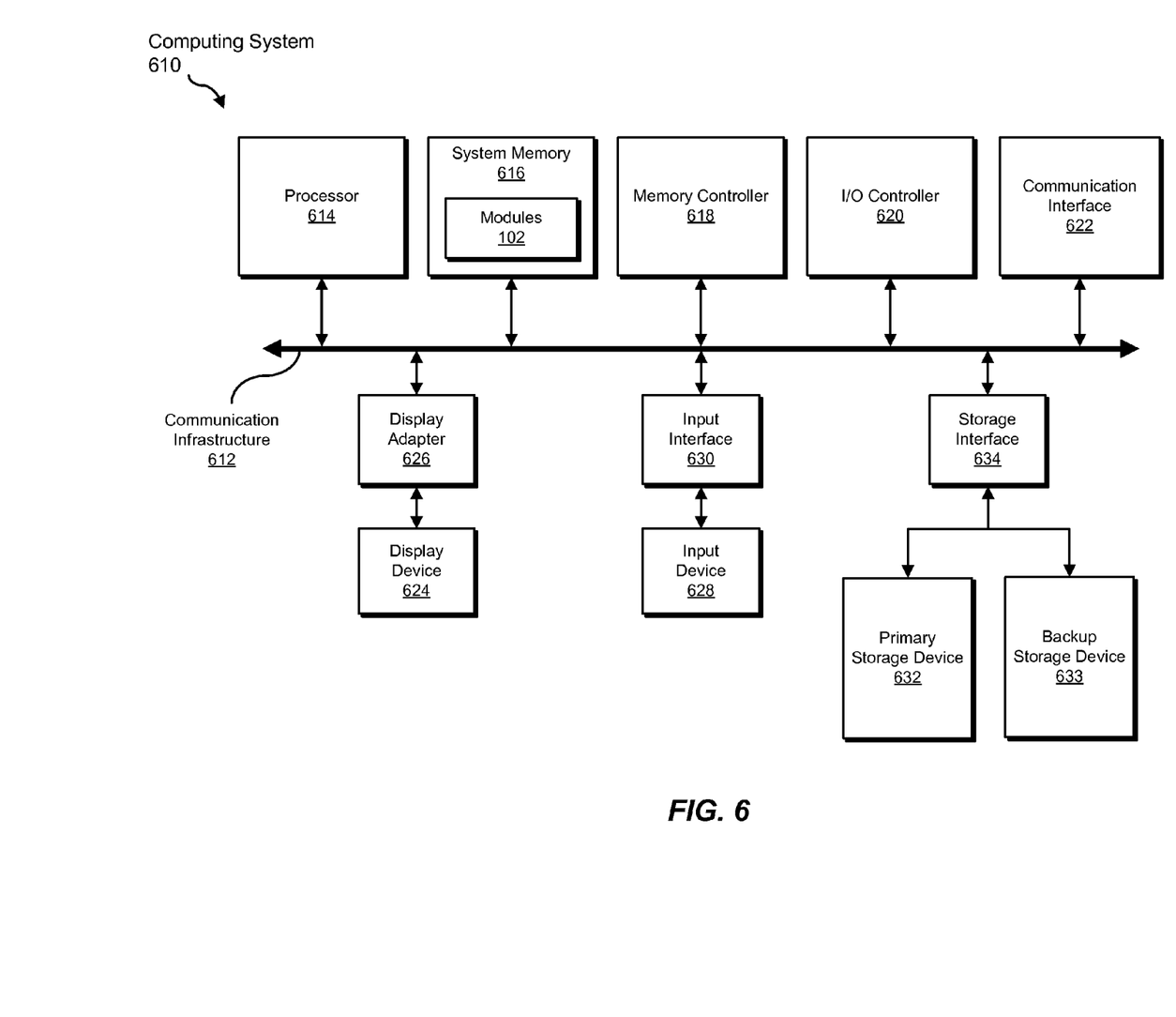
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, determining, monitoring, projecting, ordering, placing, copying, taking, marking, and/or removing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
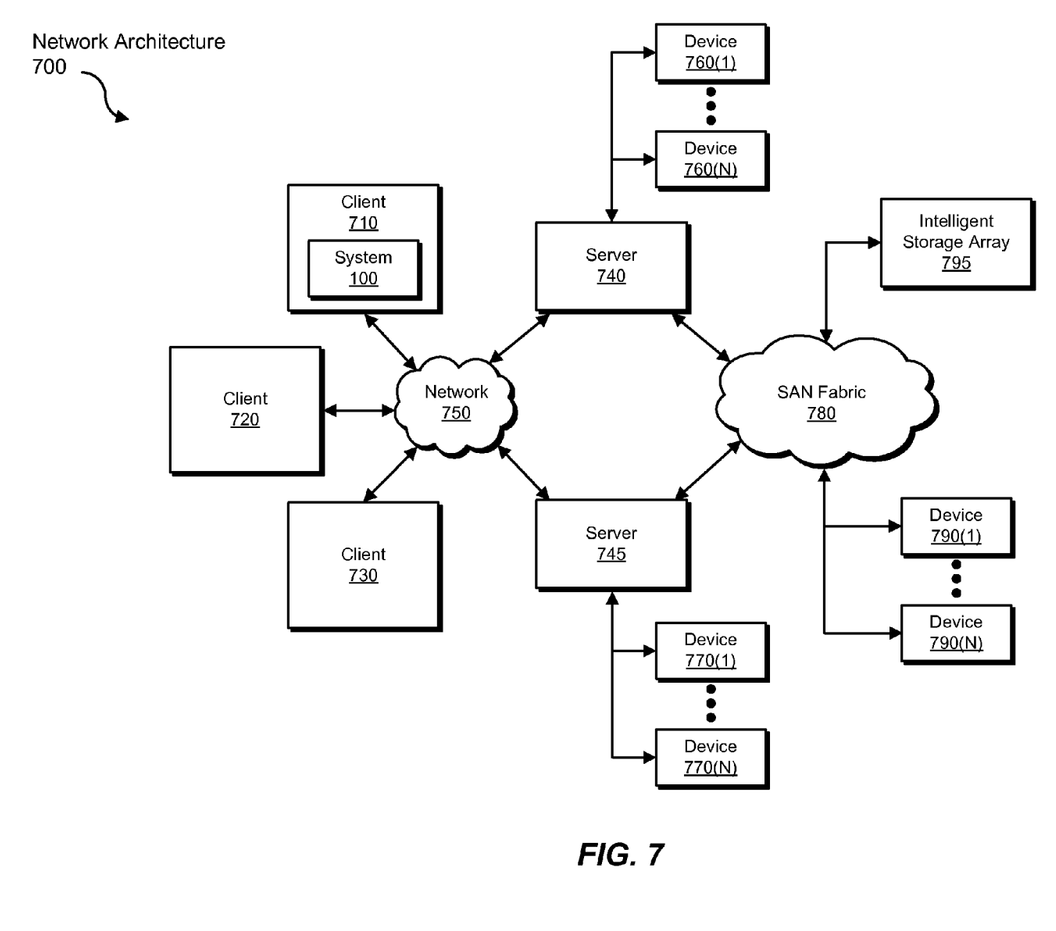
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, monitoring, projecting, ordering, placing, copying, taking, marking, and/or removing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for efficiently backing up data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for efficiently backing up data. As another example, one or more of the modules may transform a storage device into a backup.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for efficiently backing up data, at least a portion of the method being performed by a computing device comprising at least one processor, the method comprising:
    identifying a volume of data scheduled for a backup by a computing system;
    before taking a snapshot of the volume of data for the backup:
    determining that resource usage of the computing system will fall below a predetermined threshold for a period of time;
    identifying at least one unit of data in the volume of data to copy to a backup image for the backup during the period of time;
    in response to determining that the resource usage of the computing system will fall below the predetermined threshold for the period of time, copying the unit of data to the backup image during the period of time;
    taking the snapshot of the volume of data;
    after taking the snapshot of the volume of data, copying at least one additional unit of data from the snapshot to the backup image to make the backup image consistent with the snapshot.

2. The computer-implemented method of claim 1, further comprising, before taking the snapshot:
    determining that the unit of data was overwritten in the volume of data;
    in response to determining that the unit of data was overwritten, marking the unit of data as dirty to indicate that the unit of data within the backup image is no longer consistent with the volume of data.

3. The computer-implemented method of claim 1, further comprising, before taking the snapshot, identifying a most recent backup of the volume of data;
    wherein identifying the unit of data to copy to the backup image comprises identifying a change to the volume of data following the most recent backup.

4. The computer-implemented method of claim 1, wherein determining that the resource usage of the computing system will fall below the predetermined threshold comprises determining that usage of a resource that is required both for backing up the volume of data and for a separate application running on the computing system will fall below a predetermined threshold.

5. The computer-implemented method of claim 1, wherein determining that the resource usage of the computing system will fall below the predetermined threshold for the period of time comprises:
    monitoring the resource usage to collect usage data on the resource usage;
    projecting that the resource usage will fall below the predetermined threshold for the period of time based on the usage data.

6. The computer-implemented method of claim 1, wherein identifying the unit of data in the volume of data to copy to the backup image for the backup during the period of time comprises:
    at least partially ordering a plurality of units of data within the volume of data that require backup in a priority queue according to a likelihood of each unit of data within the plurality being overwritten in the volume of data before the snapshot is taken;
    identifying a first unit of data on the priority queue.

7. The computer-implemented method of claim 6, wherein partially ordering the plurality of units of data within the volume of data that require backup in the priority queue comprises:
    determining that the unit of data was overwritten in the volume of data since a most recent backup;
    in response to determining that the unit of data was overwritten since the most recent backup, placing the unit of data in a position of lower priority within the priority queue than at least one unchanged unit of data.

8. The computer-implemented method of claim 1, further comprising:
    before taking the snapshot of the volume of data for the backup:
    determining that resource usage of the computing system will fall below the predetermined threshold for a subsequent period of time separate from the period of time;
    identifying at least one subsequent unit of data in the volume of data to copy to the backup image for the backup during the subsequent period of time;
    in response to determining that the resource usage of the computing system will fall below the predetermined threshold for the subsequent period of time, copying the subsequent unit of data to the backup image during the subsequent period of time.

9. The computer-implemented method of claim 1, further comprising:
    determining that the unit of data was deleted from the volume of data before the snapshot was taken;
    in response to determining that the unit of data was deleted from the volume of data, removing the unit of data from the backup image.

10. The computer-implemented method of claim 1, wherein:
    the unit of data comprises a file stored in the volume of data;
    identifying the unit of data comprises identifying the file within a file change journal.

11. A system for efficiently backing up data, the system comprising:
    an identification module programmed to identify a volume of data scheduled for a backup by a computing system;
    a resource module programmed to, before a snapshot of the volume of data for the backup is taken, determine that resource usage of the computing system will fall below a predetermined threshold for a period of time;
    a backup module programmed to, before the snapshot is taken:

identify at least one unit of data in the volume of data to copy to a backup image for the backup during the period of time;

in response to determining that the resource usage of the computing system will fall below the predetermined threshold for the period of time, copy the unit of data to the backup image during the period of time;

a snapshot module programmed to take the snapshot of the volume of data;

a consistency module programmed to, after taking the snapshot of the volume of data, copy at least one additional unit of data from the snapshot to the backup image to make the backup image consistent with the snapshot;

at least one processor configured to execute the identification module, the resource module, the backup module, the snapshot module, and the consistency module.

12. The system of claim 11, wherein the backup module is further programmed to, before taking the snapshot:

determine that the unit of data was overwritten in the volume of data;

in response to determining that the unit of data was overwritten, mark the unit of data as dirty to indicate that the unit of data within the backup image is no longer consistent with the volume of data.

13. The system of claim 11, wherein the backup module is further programmed to, before taking the snapshot, identify a most recent backup of the volume of data;

wherein the backup module is programmed to identify the unit of data to copy to the backup image by identifying a change to the volume of data following the most recent backup.

14. The system of claim 11, wherein the resource module is programmed to determine that the resource usage of the computing system will fall below the predetermined threshold by determining that usage of a resource that is required both for backing up the volume of data and for a separate application running on the computing system will fall below a predetermined threshold.

15. The system of claim 11, wherein the resource module is programmed to determine that the resource usage of the computing system will fall below the predetermined threshold for the period of time by:

monitoring the resource usage to collect usage data on the resource usage;

projecting that the resource usage will fall below the predetermined threshold for the period of time based on the usage data.

16. The system of claim 11, wherein the backup module is programmed to identify the unit of data in the volume of data to copy to the backup image for the backup during the period of time by:

at least partially ordering a plurality of units of data within the volume of data that require backup in a priority queue according to a likelihood of each unit of data within the plurality being overwritten in the volume of data before the snapshot is taken;

identifying a first unit of data on the priority queue.

17. The system of claim 16, wherein the backup module is programmed to partially order the plurality of units of data within the volume of data that require backup in the priority queue by:

determining that the unit of data was overwritten in the volume of data since a most recent backup;

in response to determining that the unit of data was overwritten since the most recent backup, placing the unit of data in a position of lower priority within the priority queue than at least one unchanged unit of data.

18. The system of claim 11, wherein:

the resource module is further programmed to, before taking the snapshot of the volume of data for the backup, determine that resource usage of the computing system will fall below the predetermined threshold for a subsequent period of time separate from the period of time;

the backup module is further programmed to, before taking the snapshot of the volume of data for the backup:

identify at least one subsequent unit of data in the volume of data to copy to the backup image for the backup during the subsequent period of time;

in response to determining that the resource usage of the computing system will fall below the predetermined threshold for the subsequent period of time, copy the subsequent unit of data to the backup image during the subsequent period of time.

19. The system of claim 11, wherein the consistency module is further programmed to:

determine that the unit of data was deleted from the volume of data before the snapshot was taken;

in response to determining that the unit of data was deleted from the volume of data, remove the unit of data from the backup image.

20. A computer-readable-storage medium comprising one or more computer-executable instructions that, when executed by at least one processor of a computing device, cause the computing device to:

identify a volume of data scheduled for a backup by a computing system;

before taking a snapshot of the volume of data for the backup:

determine that resource usage of the computing system will fall below a predetermined threshold for a period of time;

identify at least one unit of data in the volume of data to copy to a backup image for the backup during the period of time;

in response to determining that the resource usage of the computing system will fall below the predetermined threshold for the period of time, copy the unit of data to the backup image during the period of time;

take the snapshot of the volume of data;

after taking the snapshot of the volume of data, copy at least one additional unit of data from the snapshot to the backup image to make the backup image consistent with the snapshot.

* * * * *